US011881611B2

(12) United States Patent
Steward

(10) Patent No.: US 11,881,611 B2
(45) Date of Patent: Jan. 23, 2024

(54) DIFFERENTIAL FED DUAL POLARIZED TIGHTLY COUPLED DIELECTRIC CAVITY RADIATOR FOR ELECTRONICALLY SCANNED ARRAY APPLICATIONS

(71) Applicant: Smiths Interconnect, Inc., Tampa, FL (US)

(72) Inventor: David Steward, Thousand Oaks, CA (US)

(73) Assignee: SMITHS INTERCONNECT, INC., Tampa, FL (US)

( * ) Notice: Subject to any disclaimer, the term of this patent is extended or adjusted under 35 U.S.C. 154(b) by 332 days.

(21) Appl. No.: 17/607,011

(22) PCT Filed: Apr. 29, 2020

(86) PCT No.: PCT/US2020/030526
§ 371 (c)(1),
(2) Date: Oct. 27, 2021

(87) PCT Pub. No.: WO2020/223387
PCT Pub. Date: Nov. 5, 2020

(65) Prior Publication Data
US 2022/0209387 A1 Jun. 30, 2022

Related U.S. Application Data

(60) Provisional application No. 62/841,743, filed on May 1, 2019.

(51) Int. Cl.
*H01P 5/10* (2006.01)
*H01Q 1/22* (2006.01)
(Continued)

(52) U.S. Cl.
CPC ............. *H01P 5/10* (2013.01); *H01Q 1/2283* (2013.01); *H01Q 1/24* (2013.01); *H01Q 1/38* (2013.01);
(Continued)

(58) Field of Classification Search
CPC .......... H01P 5/10; H01Q 1/2283; H01Q 1/24; H01Q 9/26; H01Q 21/062; H01Q 1/38; H01Q 21/24
(Continued)

(56) References Cited

U.S. PATENT DOCUMENTS 9,437,929 B2 * 9/2016 Isom ........................ H03H 7/42
9,525,212 B2 * 12/2016 Peng ........................ H01Q 9/16
(Continued)

FOREIGN PATENT DOCUMENTS

KR 20000010302 A 2/2000

OTHER PUBLICATIONS

International Search Report dated Aug. 18, 2020 in corresponding International Application No. PCT/US2020/030526 filed Apr. 29, 2020; total 3 pages.
(Continued)

*Primary Examiner* — Khai M Nguyen
(74) *Attorney, Agent, or Firm* — Snell & Wilmer LLP

(57) ABSTRACT

An antenna element includes a balun configured to convert an unbalanced signal to a balanced signal and having an input, a first output, and a second output. The antenna element further includes a feed layer having a first feed coupled to the first output of the balun, a second feed coupled to the second output of the balun, a first ridge coupled to the first feed, a second ridge coupled to the second feed, and a center post.

20 Claims, 12 Drawing Sheets

(51) Int. Cl.
*H01Q 1/24* (2006.01)
*H01Q 9/26* (2006.01)
*H01Q 21/06* (2006.01)
*H01Q 1/38* (2006.01)
*H01Q 21/24* (2006.01)

(52) U.S. Cl.
CPC ............. *H01Q 9/26* (2013.01); *H01Q 21/062* (2013.01); *H01Q 21/24* (2013.01)

(58) Field of Classification Search
USPC .......................................................... 343/821
See application file for complete search history.

(56) References Cited

U.S. PATENT DOCUMENTS

2014/0218253 A1 8/2014 Puzella et al.
2015/0214592 A1 7/2015 Peng et al.
2017/0033468 A1 2/2017 Wong
2017/0331194 A1 11/2017 Hsu et al.

OTHER PUBLICATIONS

Written Opinion of the International Searching Authority dated Aug. 18, 2020 in corresponding International Application No. PCT/US2020/030526 filed Apr. 29, 2020; total 5 pages.

* cited by examiner

DIFFERENTIAL FED DUAL POLARIZED TIGHTLY COUPLED DIELECTRIC CAVITY RADIATOR FOR ELECTRONICALLY SCANNED ARRAY APPLICATIONS

CROSS-REFERENCE TO RELATED APPLICATIONS

This application is a U.S. National Stage entry under 35 U.S.C. § 371 of International Application No. PCT/US2020/030526, filed Apr. 29, 2020, entitled “DIFFERENTIAL FED DUAL POLARIZED TIGHTLY COUPLED DIELECTRIC CAVITY RADIATOR FOR ELECTRONICALLY SCANNED ARRAY APPLICATIONS,” which claims the benefit and priority of U.S. Provisional Application No. 62/841,743, entitled “DIFFERENTIAL FED DUAL POLARIZED TIGHTLY COUPLED DIELECTRIC CAVITY RADIATOR FOR ELECTRONICALLY SCANNED ARRAY APPLICATIONS,” filed on May 1, 2019, the entire disclosures of which being hereby incorporated by reference in their entirety.

BACKGROUND

1. Field

The present disclosure relates to dual-polarized antenna arrays and elements thereof usable in electronically scanned array applications.

2. Description of the Related Art

The aerospace/airborne market for fuselage mounted Satellite Communication (SatCom) and other broadband antennas has expanded in the last several years with increased access to broadband satellite. Examples of these airborne antennas include parabolic dishes, patch arrays, and fixed waveguide arrays. Most of these antenna systems are fixed beam systems mounted under a radome on a two-axis positioner that tracks a Geostationary (GEO) satellite. The low-profile nature of airborne antennas limits the size and shape of the aperture, thereby limiting operational performance of the antenna because of adjacent satellite interference, which may result in added noise and/or jamming.

Additionally, airborne antenna users are increasingly utilizing satellites in the Medium Earth Orbit (MEO) and Low Earth Orbit (LEO) constellations for their various advantages such as lower signal latency and higher signal strength. These satellite platforms, however, pose additional challenges to the fuselage mounted antenna. Unlike a GEO satellite which is in a fixed position, MEO and LEO satellites have orbital periods that can range from 20 to 40 minutes. Furthermore, in some cases, the antenna must continuously hand-off from one satellite to another in the constellation and may require a simultaneous secondary receive beam to facilitate the handoff. This becomes impractical/problematic for fixed-beam mechanically-steered moving-vehicle mounted antennas.

Electronically scanned array (ESA) antennas have been around, mostly in military applications, for many years. Recently, they have become more commonly used commercially with the confluence of ancillary technologies that have allowed technology and implementation costs to decline significantly with associated improvements in performance measures. Moreover, ESA technology addresses the MEO and LEO tracking and hand-off issue in a way that mechanically steered apertures cannot. However, ESAs have several shortcomings such as a relatively low usable bandwidth, relatively low scan angle performance and relatively high cost.

Therefore, there is a need in the art for improved antenna arrays and elements thereof for use in ESAs in moving vehicles.

SUMMARY

Disclosed herein is an antenna element. The antenna element includes a balun configured to convert an unbalanced signal to a balanced signal and having an input, a first output, and a second output. The antenna element further includes a feed layer having a first feed coupled to the first output of the balun, a second feed coupled to the second output of the balun, a first ridge coupled to the first feed, a second ridge coupled to the second feed, and a center post.

Also disclosed is an antenna element. The antenna element includes a printed circuit board (PCB). The antenna element further includes a balun formed integral with the PCB and configured to convert an unbalanced signal to a balanced signal and having an input, a first balanced side, and a second balanced side. The antenna element further includes a feed layer formed integral with the PCB and having a first feed coupled to the first side of the balun, a second feed coupled to the second side of the balun, a first ridge coupled to the first feed, a second ridge coupled to the second feed, and a center post.

Also disclosed is an antenna element. The antenna element includes a printed circuit board (PCB). The antenna element further includes a balun formed integral with the PCB and configured to convert an unbalanced signal to a balanced signal and having an input, a first output, and a second output. The antenna element further includes a feed layer formed integral with the PCB and having a first feed coupled to the first output of the balun, a second feed coupled to the second output of the balun, a first ridge coupled to the first feed, a second ridge coupled to the second feed, and a center post. The antenna element further includes a wide area impedance matching (WAIM) layer bonded to the PCB and at least one of in close proximity to or in contact with the feed layer.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

Figure 1A:
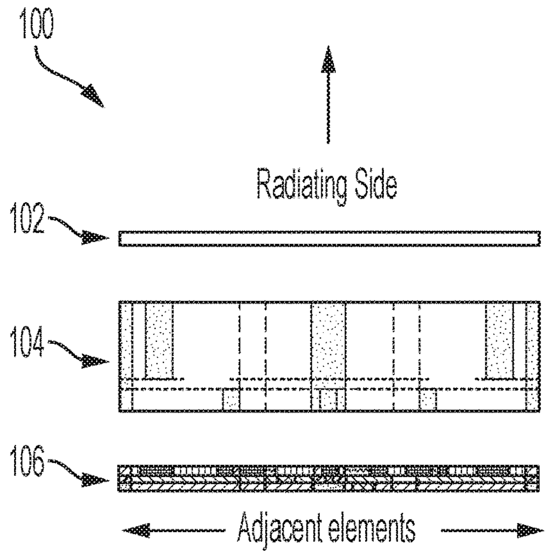
FIGS. 1A, 1B, and 1C illustrate an exploded cross-sectional view, an exploded perspective view, and a cross-sectional view, respectively, of an antenna element according to an embodiment of the present invention.

The present disclosure describes antenna arrays and elements thereof that address the shortcomings of current electronically scanned array (ESA) technology with respect to highly efficient useable gain bandwidth covering the satellite communication (Satcom) band, high scan angle performance, and consistent and high cross polar isolation over a full scan angle range. Important to mobile antenna platforms is a physically robust architecture. This disclosure accomplishes the above performance issues with true planar circuit board technology as its core construction. Prior considerations have not adequately tackled this issue for mobile platforms (e.g., moving vehicles such as landcraft, aircraft, marinecraft, or the like).

The present disclosure facilitates integration of patched element arrays directly with a digital beamformer and power electronics on an opposite side of a circuit board, resulting in a compact and robust planar structure. However, a patch element in an ESA array typically has limited flat gain bandwidth of typically 7-10 percent (%), and cross polar isolation bandwidth that is in the range of 5-6% at best. Modern Satcom bands typically require in excess of 17% flat gain bandwidth in at least the receive array uniform cross polar isolation across that bandwidth. Wide scan angle beam steering ability is also limited in the patch element array because of their close proximity (λ/2 phase center spacing, λ, referring to wavelength) to avoid grating lobes. Depending on the height of the element above the ground plane, surface fields are produced that may add destructively with the radiated field at some scan angles causing a scan blindness condition. Attempts have been made to alleviate this condition by de-coupling patch elements from their adjacent counterparts by constructing via "fences" around the elements.

Voltage standing wave ratio (VSWR) bandwidth of 5:1 is reported for Planar Ultra Wideband Modular Array (PUMA) structures. PUMA arrays comprise a planar dual dipole structure that is orthogonally polarized. The phase centers of the vertical and horizontal dipoles are typically not co-located laterally which requires an additional phase term in the beamformer vector summing algorithm to maintain adequate peak beam and cross polar isolation performance over a large bandwidth and large scan angles. The dipole elements are separated from the ground plane by λ/4 spacing with thin feed lines making the feed structure inductive with respect to the ground plane. Capacitive coupling between adjacent dipoles counteracts the dipole feed inductance leading to a broad bandwidth structure in a Tightly Coupled Array (TCA). The TCA forms a current sheet. The dipoles in the PUMA array are fed in either a balanced or an unbalanced configuration. In the unbalanced case where only one side of the dipole is excited, shorting posts must be placed along the dipole feed to move common mode, or monopole mode resonances outside of the operating band. A hybrid 180-degree coupler is used in the balanced case to feed both sides of the dipole. The majority of literature relating to PUMA arrays describe the structure as planar, with the dipole elements on a top circuit board layer, a foam layer to separate the layers and then a circuit board layer that accommodates the balun and other circuitry. However, this kind of mixed substrate structure is only pseudo-planar and does not lend itself well to an integrated printed circuit technology inclusive of the radiator structure and the digital/power/RF layers as there are vertical interconnects which renders them implausible for very large element count arrays.

The present disclosure describes an antenna array and elements thereof for generating satellite communications that provide high efficiency gain, dual orthogonal linear polarization, broad flat gain bandwidth, high scan angle efficiency, and high cross polar isolation for use in phased array applications by utilizing Substrate Integrated Waveguide (SIW) components and Substrate Integrated RF (SIRF) components in multi-layer printed circuit board technology. The antenna array and antenna elements described herein also make use of and integrates a SIW Orthomode Transducer (OMT) method to generate an overall low inductance element with respect to the ground plane, thereby reducing the effects of common mode resonances. The antenna integrates all components from the radiating surface to the digital/power/radio frequency (RF) layers, with no intervening mixed substrate layers in a true planar structure, thereby allowing for low cost, highly manufacturable, and reliable phased array apertures.

This disclosure describes a single antenna array element within an overall antenna array and the components related to the proper functioning of the radiating element, and not to the digital electronics that are integral to the array panel. Such elements are known in the art, and this disclosure is not directed thereto. Also, as an important aspect of the design of the present disclosure, each element depends on adjacent element coupling to realize the benefit in the overall array. Therefore, the intent of the disclosure is to design the broadband array element as an integral part and construction of the overall array system.

The antenna array described herein provides for broad flat gain bandwidth and high aperture efficiency in a planar circuit board construction by utilizing a ridged ortho-mode transducer integrated into the substrate. This design overcomes the high inductive feed lines of previous art such as PUMA array planar dipole feeds and also realizes a predominantly capacitive feed with ground.

The disclosure further describes an antenna array for generating high cross polar isolation and maintaining high isolation performance over wide aperture scan angles by exciting the orthogonal feed arms of the OMT differentially by means of a hybrid 180-degree balun/coupler that is integrated in planar layers. High isolation performance over scan angle is also accomplished by co-locating the orthogonal polarizations.

The disclosure further describes an antenna array for realizing optimum/high scan angle gain roll-off by implementing a element level Wide Area Impedance Matching (WAIM) surface that uses either a shaped dielectric surface, or a planar surface with holes/slots to realize a scan angle dependent inhomogeneous effective dielectric matching interface to free space. The WAIM surface can be bonded to the surface of the antenna, separated by air, or comprised of separate layered materials in its makeup. In addition, the key function of the antenna does not depend on the WAIM surface; rather, the WAIM surface exists to provide enhanced performance of the antenna.

The disclosure further describes construction of the antenna array as a multi-layer circuit card that uses standard circuit board fabrication techniques without compromising high levels of performance from the antenna. To accomplish this, the balun/combiner and OMT section use vias and traces as conductors.

Figure 1B:
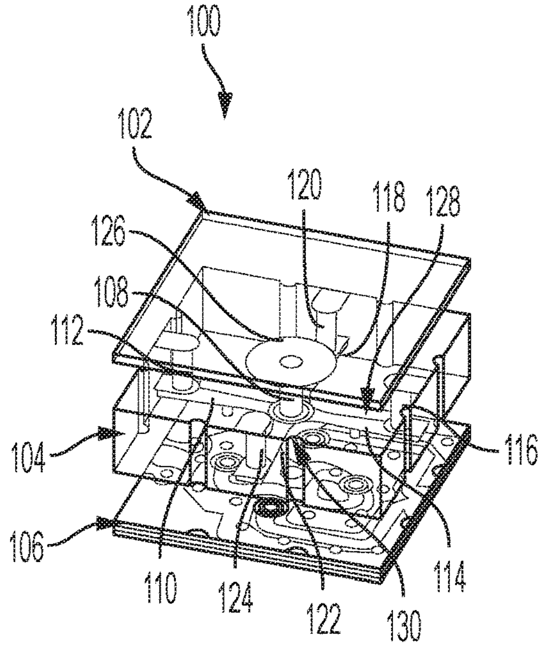
Figure 1C:
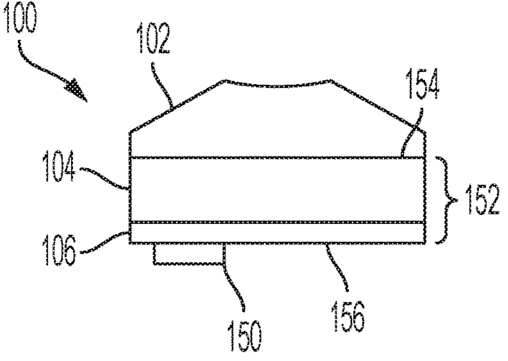
Figure 2:
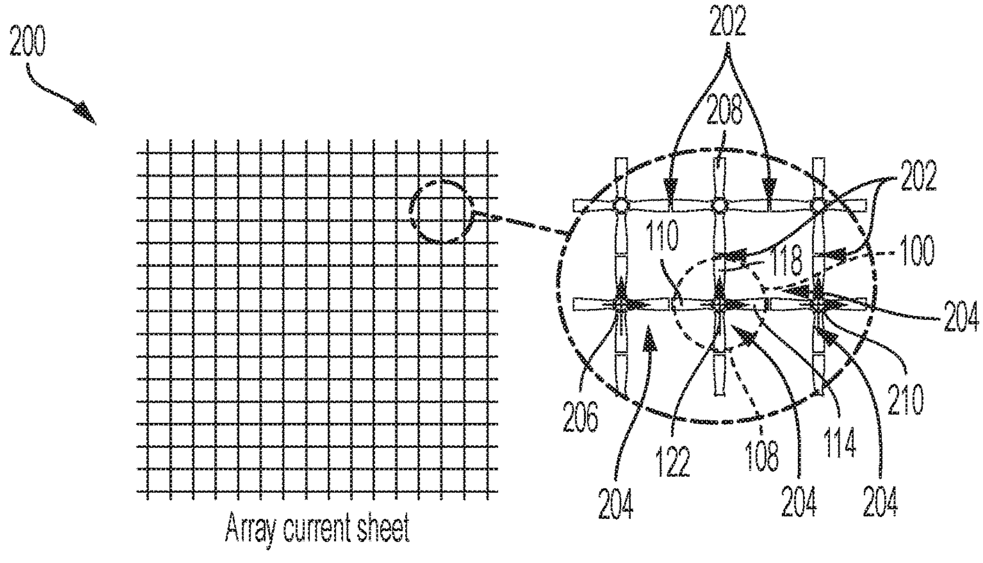
FIG. 2 illustrates an antenna array including the antenna element of FIGS. 1A, 1B, and 1C according to an embodiment of the present invention.

The embodiment shown in FIGS. 1A, 1B, and 1C illustrates a single antenna element 100 within an overall array (e.g., the antenna array 200 of FIG. 2). The array element 100 electromagnetically couples with adjacent elements to make a tightly coupled array (TCA), or coupled array (CA). The element coupling is accomplished by closely spaced capacitive edge coupling between elements and allows for uniform distribution of currents across the full surface of the array at any scan angle. This method of signal receipt and transmission is termed a current sheet. The embodiment of FIGS. 1A, 1B, and 1C uses a novel approach that significantly reduces the element inductance with respect to the ground plane by implementing a ridged waveguide OMT structure in the element substrate.

The basic structure of the antenna element 100 of FIGS. 1A, 1B, and 1C is divided into three principal areas each having their unique function in the overall antenna array. From bottom to top on the left-hand side, (1) the integrated balun layer 106 contains two hybrid 180-degree baluns (as further described below) that split the two orthogonal input signals in order to generate appropriately-polarized ridge fields. (2) the feed/orthomode cavity layer 104 serves two main functions: first, by means of the feed it excites 180 degree apposing and/or opposing fields between the OMT outer ridges and the center post; and second, the feed is closely spaced with equal adjacent feeds to facilitate mutual coupling. (3) the WAIM surface layer 102 is a boundary impedance matching surface that transitions the boundary impedance of the element to the impedance of free space. The slanted surface, by means of refraction, acts to lessen the mutual coupling between adjacent elements.

As shown in more detail in FIG. 1C, the feed layer 104 and the balun layer 106 are formed or included in a printed circuit board (PCB) 152. This allows for relatively inexpensive manufacturing of the antenna element 100 (and, thus, an entire antenna array) as well as relatively tight tolerances of the antenna design. The WAIM layer 102 may be coupled (e.g., via bonding or in other method) to a first side 154 of the PCB 152, and a processor or controller 150 may be coupled to a second side 156 of the PCB 152. The controller 150 may include any electronic device capable of performing logic functions such as a processor, controller, or discrete logic device. The controller 150 may include a non-transitory memory capable of storing instructions usable to implement logic functions. The controller may include, for example, a digital signal processor (DSP) capable of generating and/or deciding wireless signals transmitted by, or received from, the antenna element 100.

The antenna element 100 may include a first balun 128 including a first output arm 110 coupled to a first ridge 112 and a second output arm 114 coupled to a second output ridge 116. The antenna element 100 may further include a second balun 130 including a first output arm 118 coupled to a first output ridge 120 and a second output arm 122 coupled to a second output ridge 124. Additional details of the first balun and the second balun will be discussed in further detail below. Each of the first balun 128 and the second balun 130 may convert between balanced signals and unbalanced signals. For example, the first balun may convert an unbalanced input into a first balanced output and a second balanced output, and vice versa.

Referring now to FIG. 2, and antenna array 200 which includes the antenna element 100 is shown. As shown, the antenna array 200 includes a two-dimensional array of antenna elements. For example, the element 100 is adjacent to antenna elements 206, 208, and 210. Capacitive couplings 202 may be present between the various antenna elements, and the phase centers of the antenna elements may be co-located at locations 204 in both the vertical and horizontal directions. As shown, the output arms 110, 114, 118, and 122 are located adjacent to output arms of adjacent antenna elements in order to form the adjacent feed capacitive couplings 202.

Figure 3A:
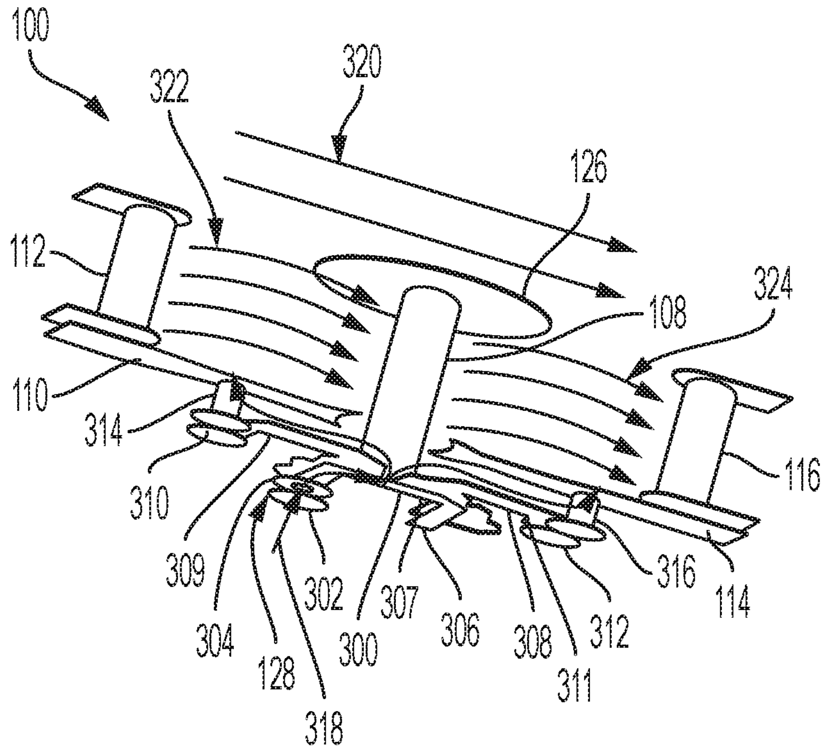
FIGS. 3A and 3B illustrate a perspective view and a cross-sectional view of a balun layer and a feed layer of the antenna element of FIGS. 1A, 1B, and 1C according to an embodiment of the present invention.
Figure 3B:
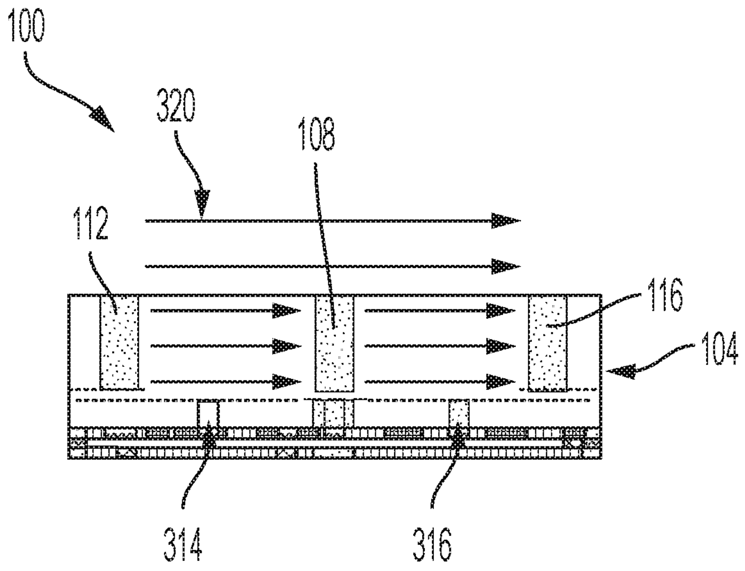

The orthomode transducer (shown and described in more detail below) that is a part of the embodiment employs two differential feeds per polarization to excite the electric field into the ridged cavity. FIGS. 3A and 3B illustrate additional features of the antenna element 100 along with signal flow from input to radiated aperture field of one polarization of the antenna element 100.

The signal is received at an input 318 of the first balun 128 and splits into two paths (as shown by arrows 318) via the hybrid balun/splitter 128. That is, the first balun 128 serves to both split the input signal into two paths, and also serves to convert a balanced signal (e.g., the input signal) into an unbalanced signal that is 180 degrees in phase difference between the unbalanced arms, and vice versa. The first balun 128 includes a first portion 300 that has a first arm 304 and a second arm 306 connected by a third arm 307. The first balun 128 also includes a second portion 308 that includes a first arm 309 that connects the first arm 304 of the first portion 300 to a first output 310, and a second arm 311 that connects the second arm 306 of the first portion 300 to a second output 312. The second arm 311 is oriented 180 degrees from the first arm 309. A first feed post 314 connects the first output 310 to the first feed arm 110, and a second feed post 316 connects the second output 312 to the second feed arm 114.

The splitter phase is 180 degrees separated from each other. The split signal excites the feed arms, or output arms, 110, 114 under the ridges 112, 116 to create two differential ridge fields 322, 324 that travel up the ridge/center post 108. The ridges 112, 116 are spaced from the center post 108 to adjust the distributed capacitance and lower the ridge cut-off frequency well below the operating bandwidth. A metal disk 126 on the center post serves as an additional capacitive tuning mechanism. As shown in FIGS. 1A-1C, the orthogonal radiated aperture fields produced by the ridges 112, 116 emanate with co-located phase centers. This means that the vertical and horizontal fields produced are isolated but emanate from the same phase location. This aspect of the array is important for maintaining acceptable cross polar isolation when the array is scanned off boresight.

Figure 4A:
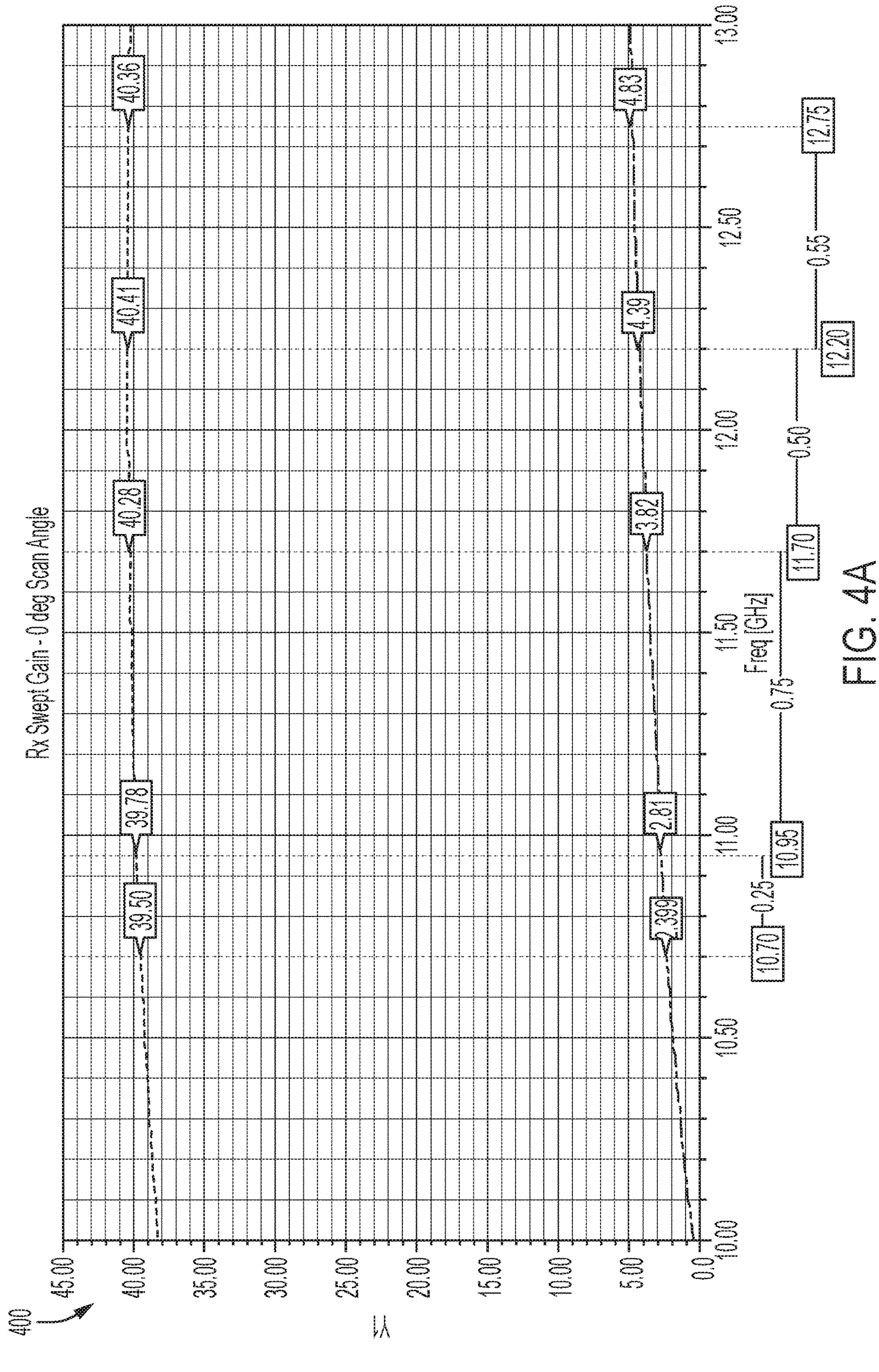
FIGS. 4A and 4B illustrate broadband flat gain and active VSWR of OMT phased array of the antenna element of FIGS. 1A, 1B, and 1C according to an embodiment of the present invention.
Figure 4B:
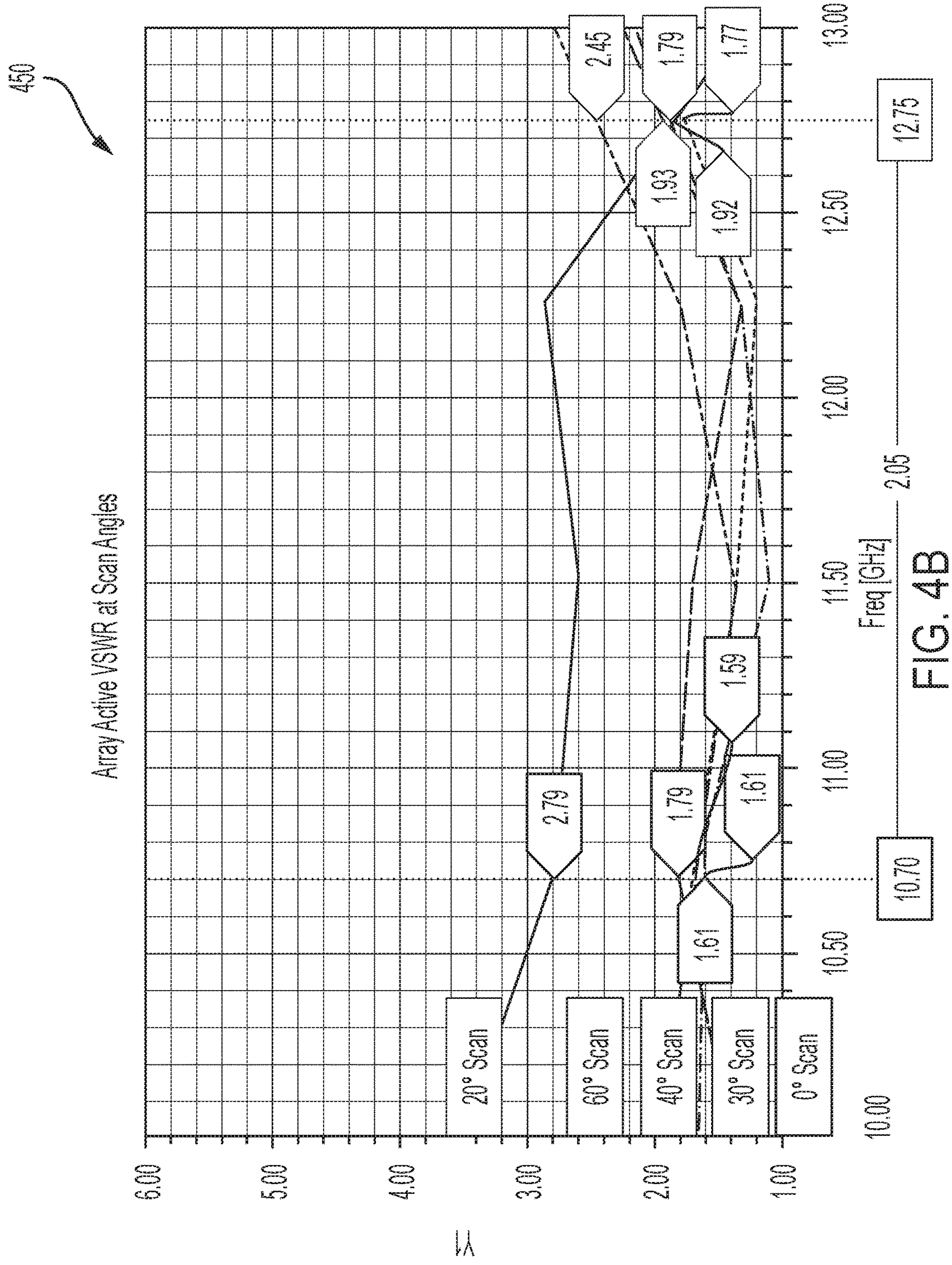

Additionally, the feed section of the OMT is capacitively coupled to edge elements which serves to distribute uneven currents created by high scan angle mutual coupling between elements. The broadband flat gain response of the ridged OMT is apparent from gain and active VSWR plots shown in FIGS. 4A and 4B. In particular, a first graph 400 illustrates gain of the antenna element 100, and a second graph 450 illustrates array active VSWR at various scan angles.

The embodiment generates a 180 degree phase and equal amplitude split necessary for the ridged OMT differential feeds by means of two hybrid 180 degree baluns (e.g., the first balun 128 and the second balun 130 of FIG. 1B), each generating isolated independent fields for the two polarizations. Furthermore, the two hybrids generate fields independent of one another.

Figure 5A:
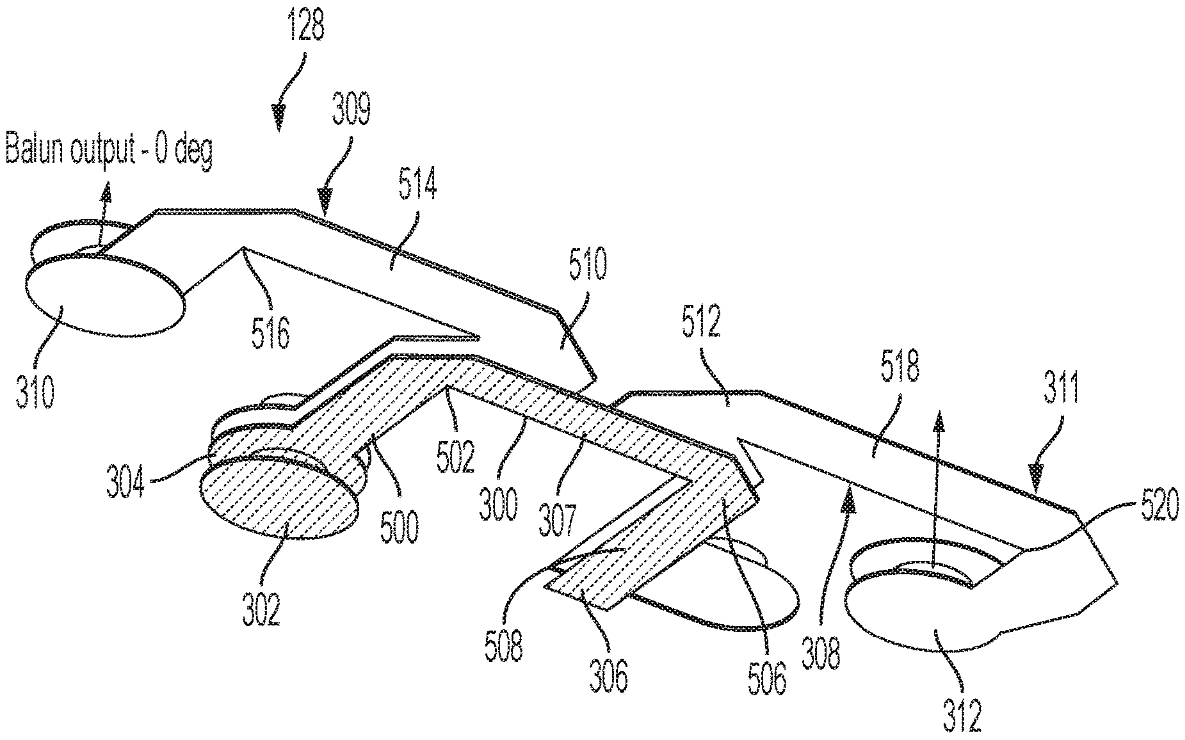
FIGS. 5A and 5B illustrate the balun layer of FIGS. 3A and 3B and a phase turn therefrom according to an embodiment of the present invention.
Figure 5B:
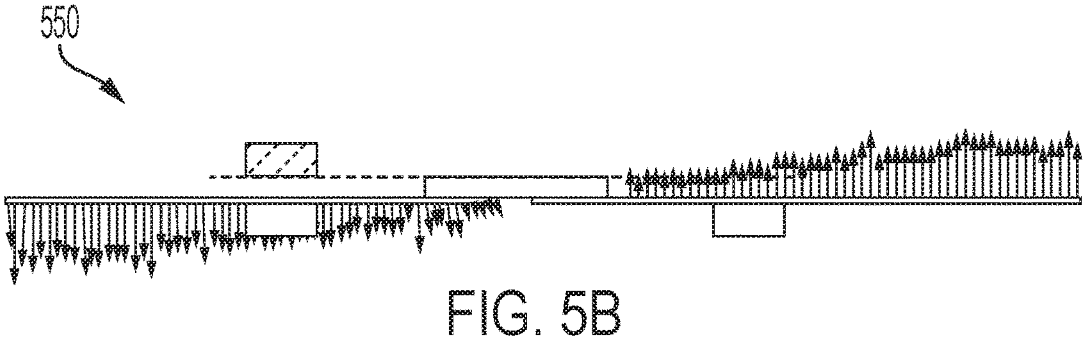

FIG. 5A illustrates a first embodiment of the hybrid 180-degree balun/splitter 128, which is a Marchand Balun configuration. The input trace 302 is broadside coupled to the two balun arms 309, 311 of the second portion 308 through a 90 degree reflective balun (i.e., the first portion 300). In particular, the input signal transfers through the first arm 304, the second arm 306, and the third arm 307 of the first portion 300 to the second portion 308. As shown, the first portion 300 has a first quarter wavelength turn 502 and a second quarter wavelength turn 506. The first balun arm 309 of the second portion 308 has a first quarter wavelength turn 510 and a second quarter wavelength turn 516 spaced apart by a trace 514, and the second balun arm 311 of the second portion 308 has a first quarter wavelength turn 512 and a second quarter wavelength turn 520 separated by a trace 518. A plot 550 illustrates the phase turn of the balun 128.

Figure 6A:
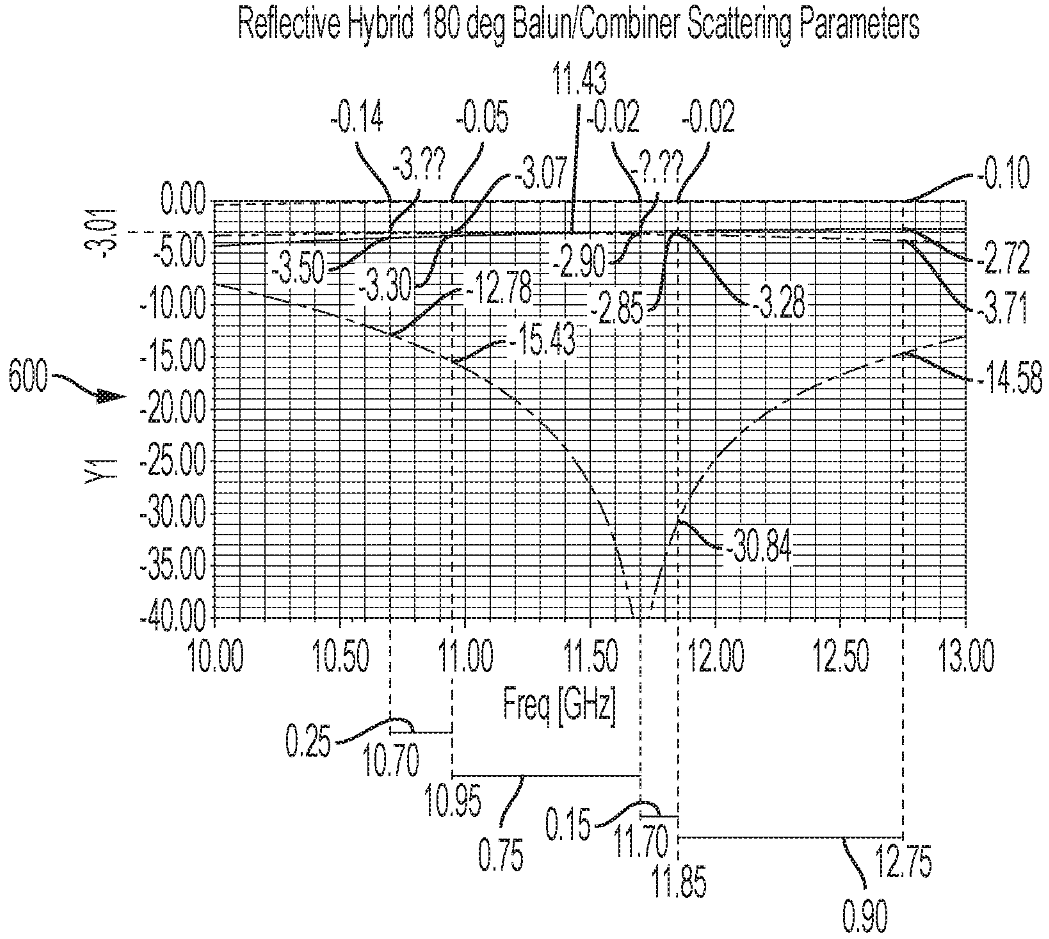
FIGS. 6A and 6B illustrate S-parameter and phase difference plots achieved using the balun layer of FIG. 5A according to an embodiment of the present invention.
Figure 6B:
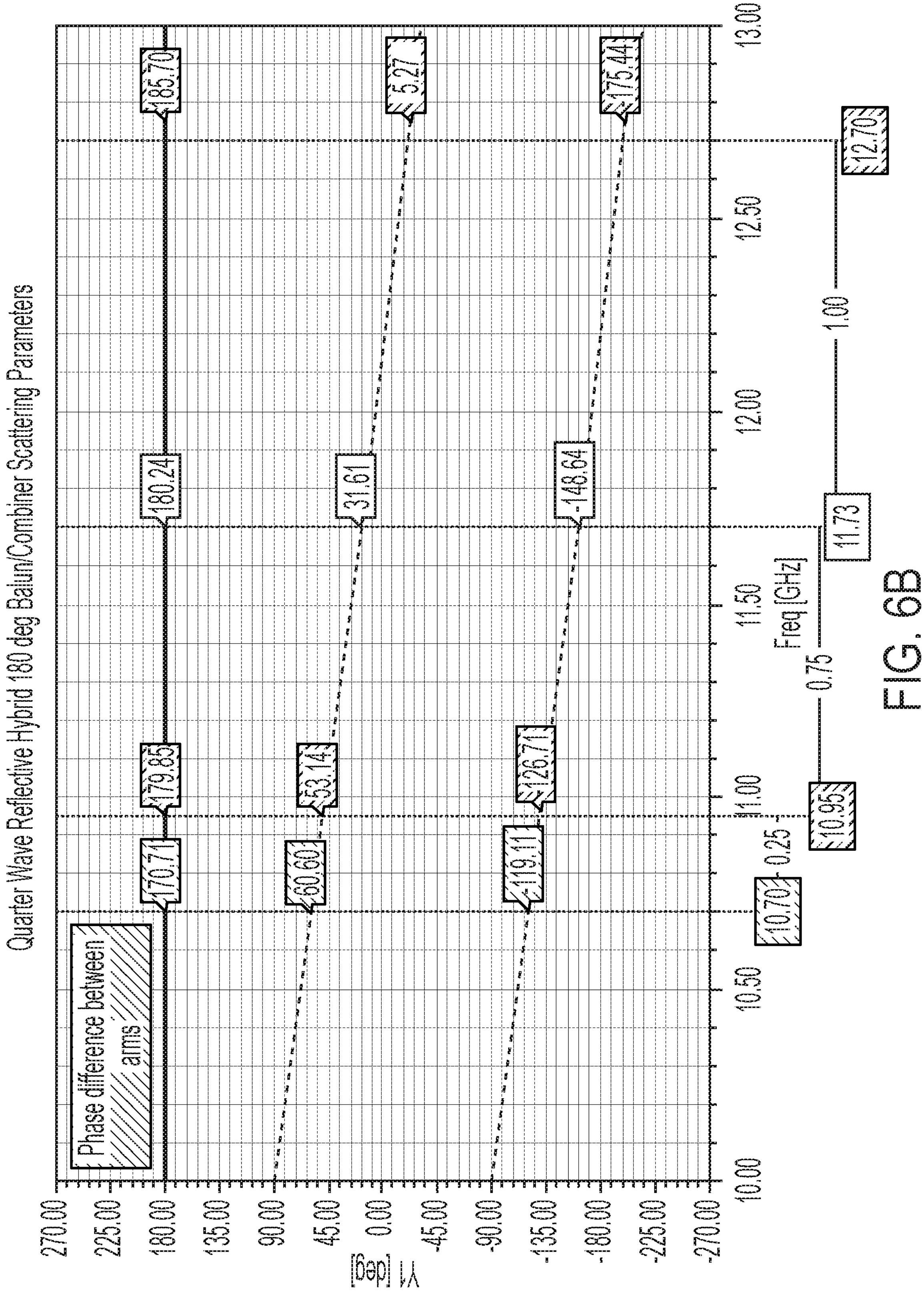

FIGS. 6A and 6B are charts 600 and 650 illustrating the performance scattering parameters (S-parameters) and phase curves for the balun 128.

Figure 7:
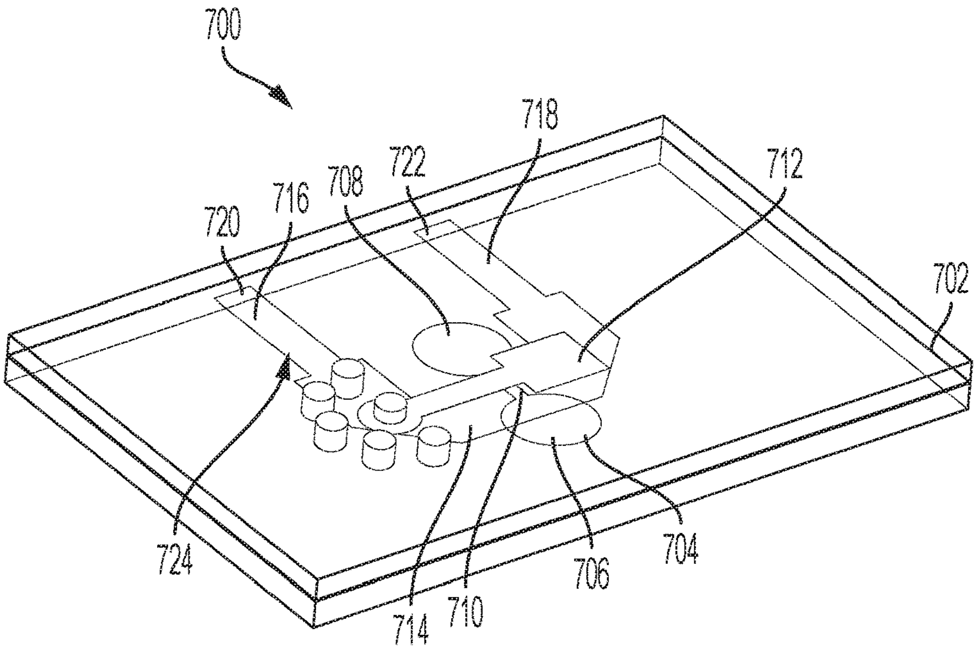
FIG. 7 illustrates an alternative balun layer capable of use with the antenna element of FIGS. 1A, 1B, and 1C according to an embodiment of the present invention.
Figure 8A:
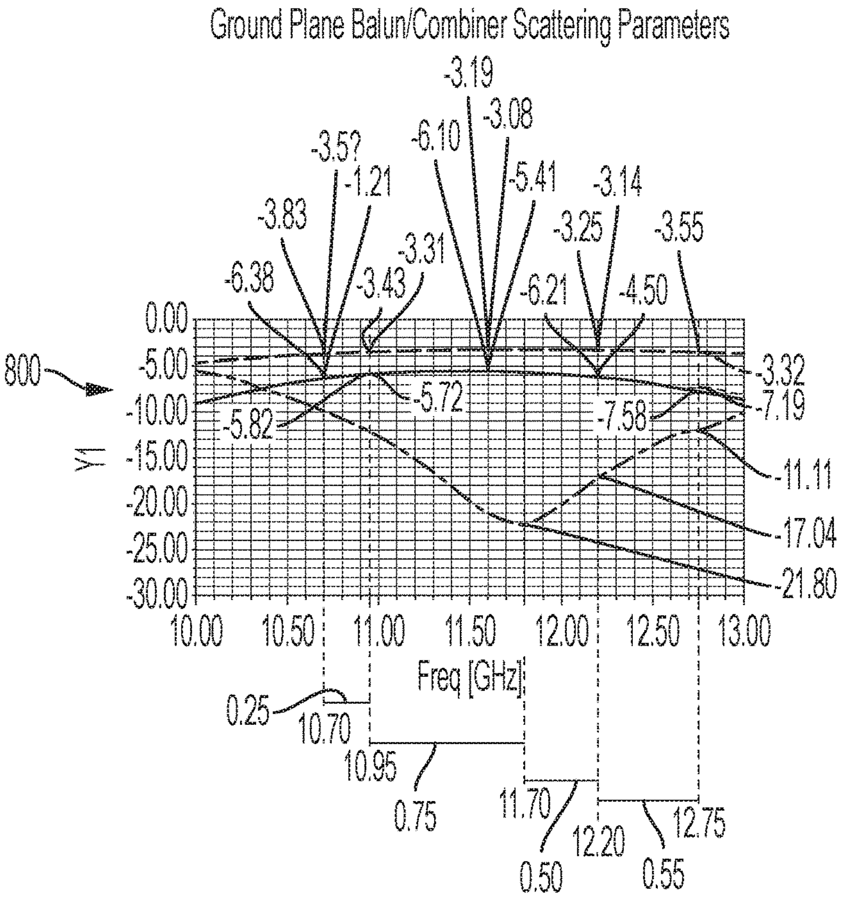
FIGS. 8A and 8B illustrate S-parameter and phase difference plots achieved using the balun layer of FIG. 7 according to an embodiment of the present invention.
Figure 8B:
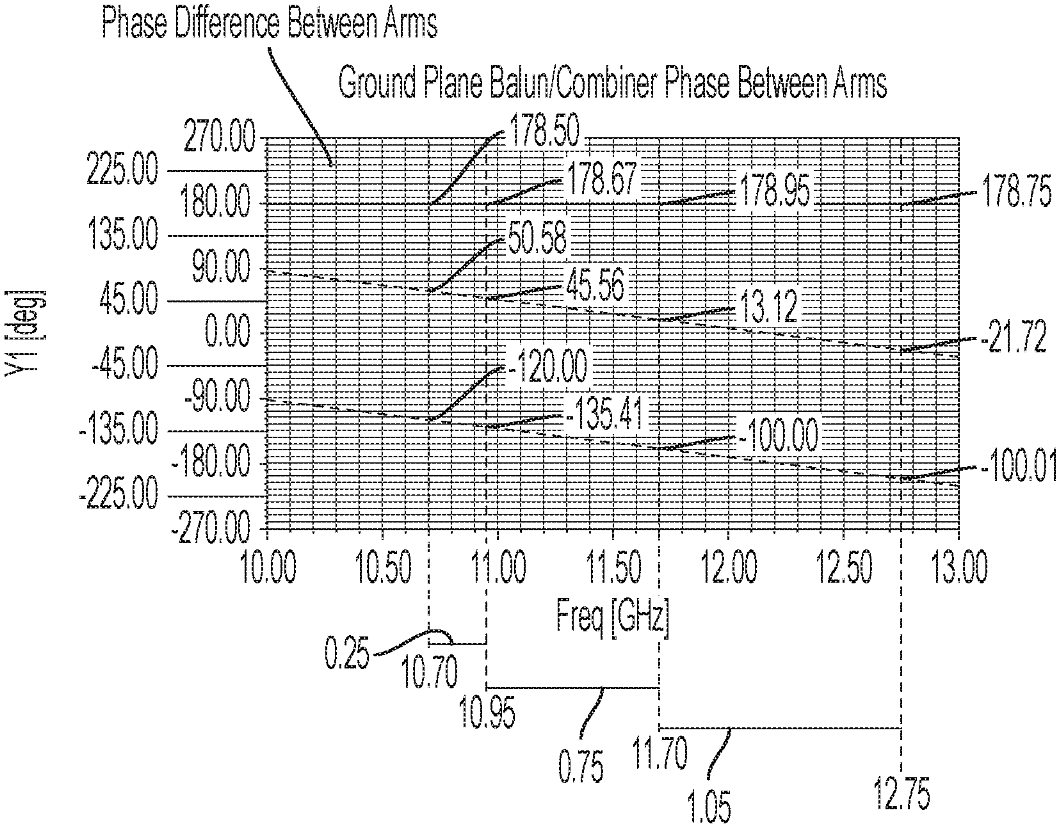

A second embodiment of a hybrid 180-degree balun/splitter 700 is shown in FIG. 7. This hybrid configuration generates a similar 180 degree phase and 3-decibel amplitude split as the balun 128 of FIG. 1B by coupling balun arms through a slotted ground plane. In particular, the balun 700 is implemented in a ground plane 702 and includes a slot 704 having a first circular opening 706 and a second circular opening 708 separated by a neck 710. An input speed 712 extends over the neck 710 and transfers the input signal to the balun 700. An output feed 724 includes a first output trace 716 and a second output trace 718 separated by a connector trace 714. The first output trace 716 outputs a signal at a first output 720 and the second output trace 718 outputs a signal at a second output 722. In this configuration, the slot 704 in the ground plane 702 generates the 180 degree phase shift. FIGS. 8A and 8B illustrate S-parameter and phase performance plots 800, 850 for the ground plane balun 700.

Figure 9:
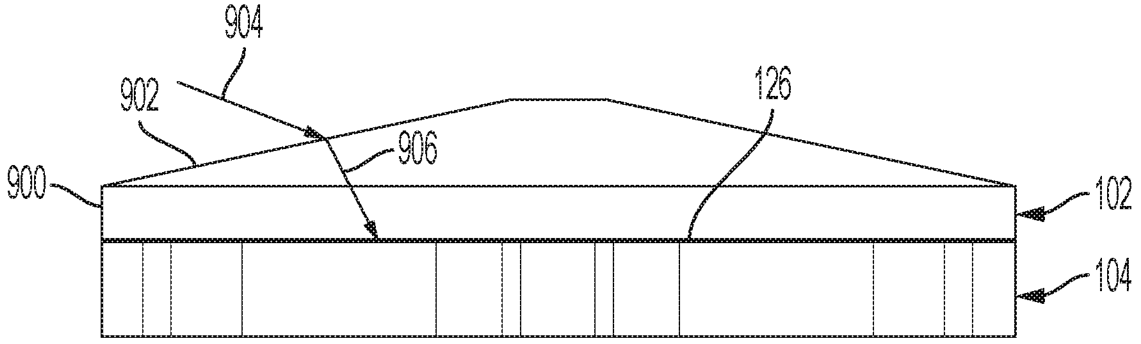
FIG. 9 illustrates a wide area impedance matching (WAIM) layer of the antenna element of FIGS. 1A, 1B, and 1C according to an embodiment of the present invention.

Optimal wide scan angle performance of the overall array is accomplished by the element level shaped WAIM surface in conjunction with adjustments to the OMT cavity height (ridge length) and inter element capacitance. An embodiment of the WAIM surface 102 is shown in FIG. 9. As shown, the surface 102 may be in close proximity to the feed layer 104 (e.g., within 10 millimeters, 5 millimeters, 1 millimeter, 0.5 millimeters, 0.05 millimeters, or the like of the feed layer 104), or maybe bonded or otherwise coupled to the feed layer 104. The WAIM surface may contact the metal disk 126. In particular, the surface 102 includes a rectangular portion 900 that is in contact with the feed layer 104 and a trapezoidal portion 902 stacked on the rectangular portion 900. The WAIM surface creates a scan angle dependent refraction at the outer surface of the radiating element, as shown by arrows 904 and 906, which provides an optimal impedance match to the element surface, thereby counteracting the effects of undesired mutual coupling between adjacent elements. Improvements in high scan angle gain are made by adjusting the angular surface of the WAIM (the outer surface of the trapezoidal portion 902), adjusting the coupling capacitance between adjacent elements and changing the height of the OMT cavity, which changes the element boundary reflection coefficient.

Figure 10A:
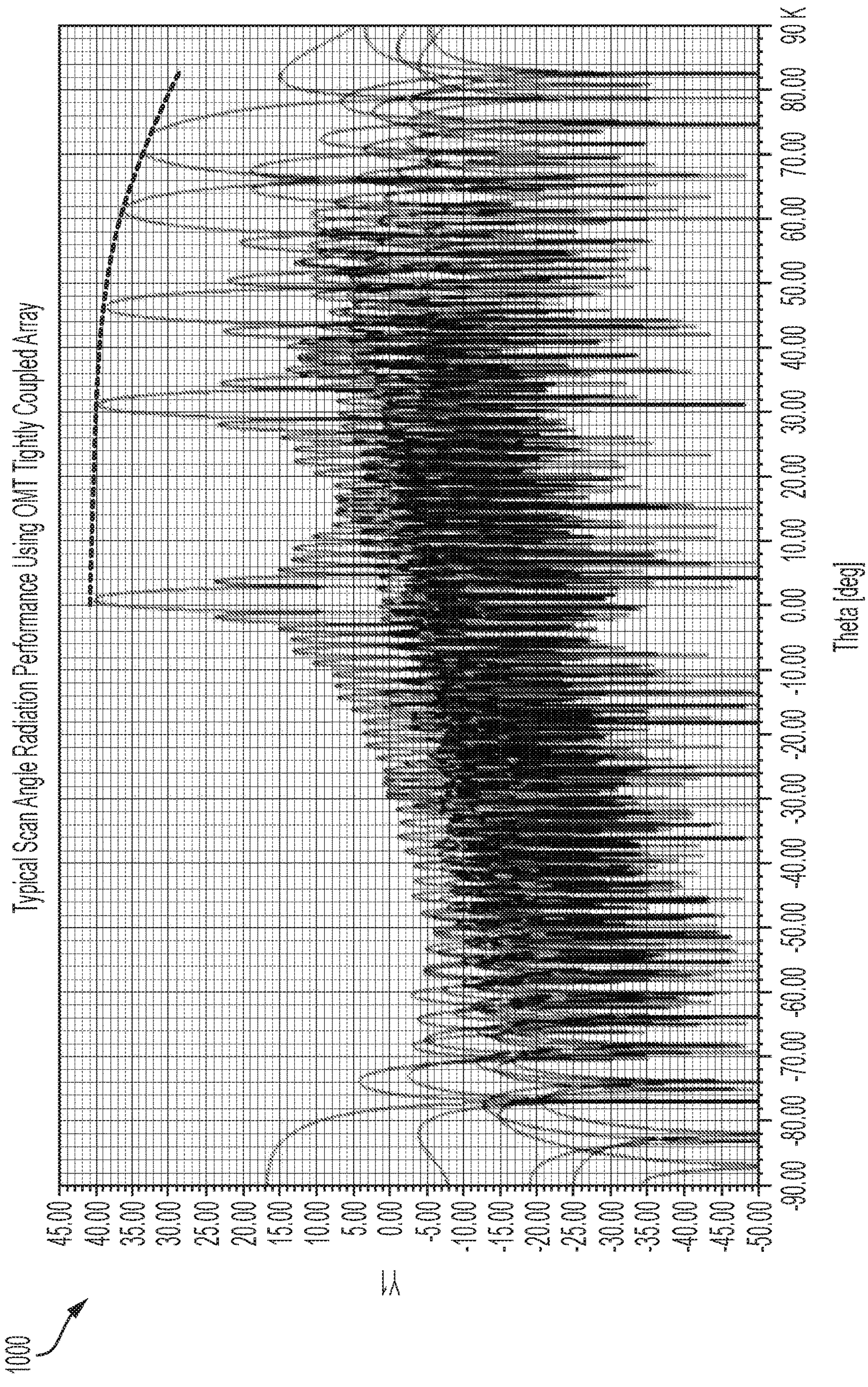
FIGS. 10A and 10B illustrate multiple angle scan plots of array gain and peak gain roll-off and active VSWR of the WAIM layer of FIG. 9 according to the embodiment of the present invention.
Figure 10B:
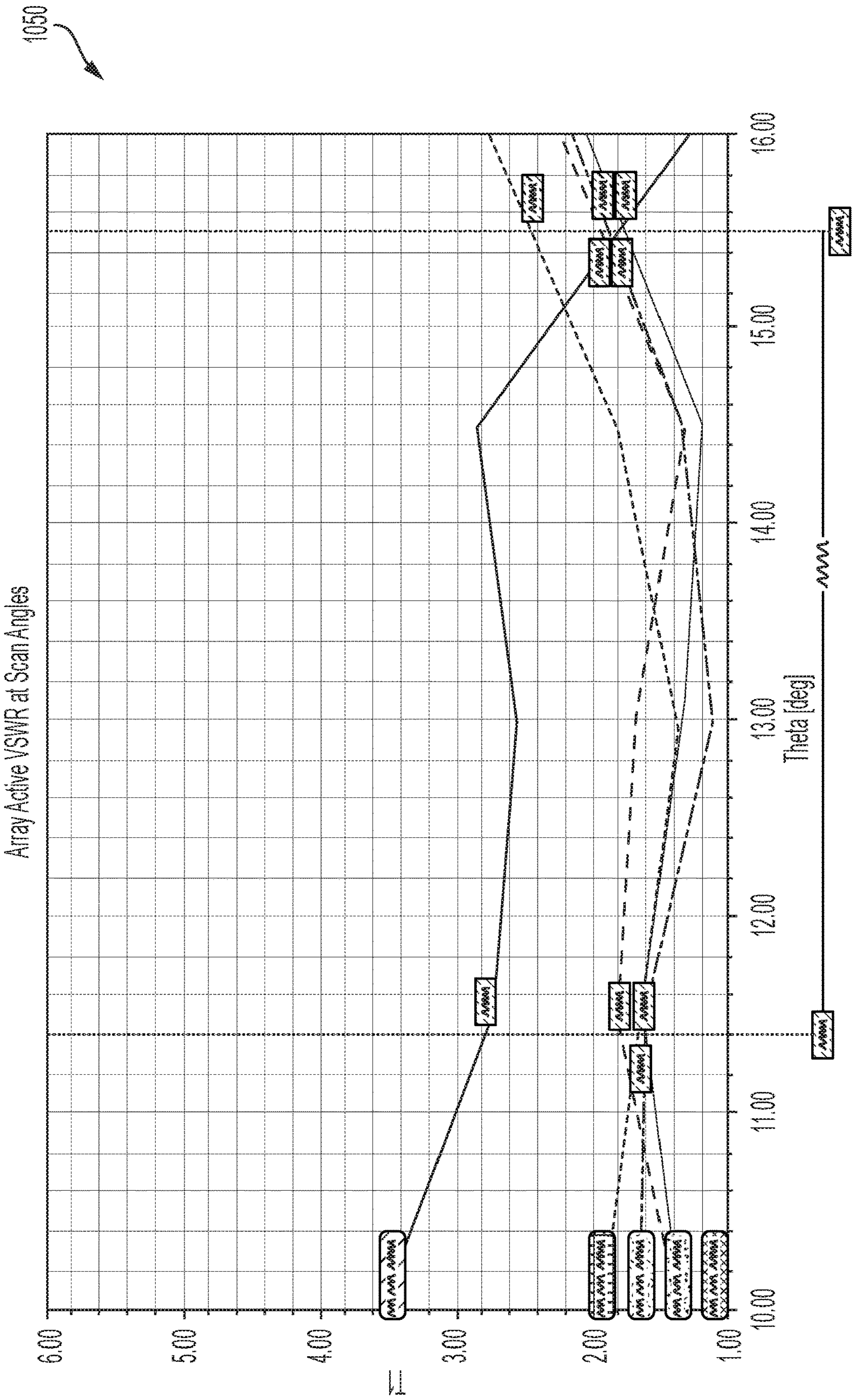

FIG. 10A is a graph 1000 illustrating scan angle radiation performance of the WAIM surface 102 of FIG. 9 using OMT TCA technology, and FIG. 10B is a graph 1050 illustrating array active VSWR at various scan angles using the WAIM surface 102 of FIG. 9.

Figure 11:
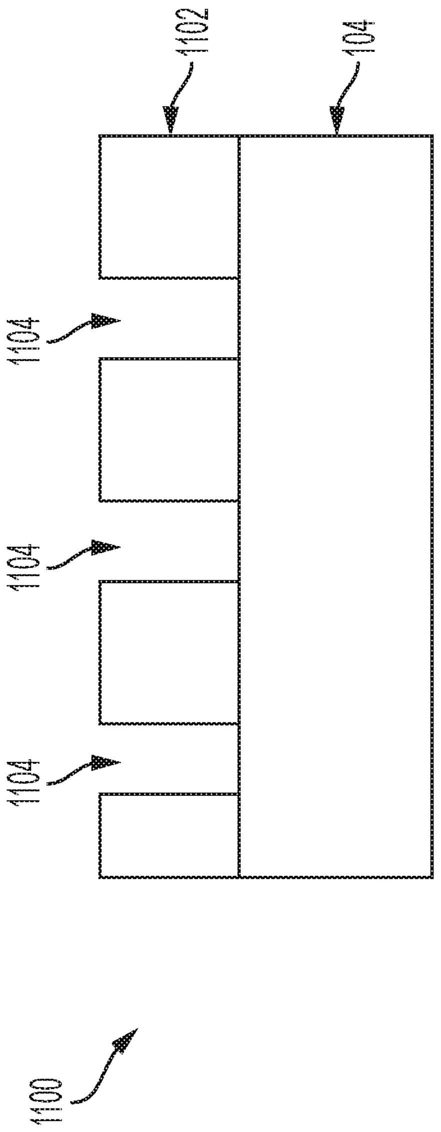
FIG. 11 illustrates an alternative WAIM layer capable of use with the antenna element of FIGS. 1A, 1B, and 1C according to an embodiment of the present invention.

FIG. 11 illustrates an alternative embodiment of a WAIM surface 1100, which may include a planar or rectangular prism shape 1102 with apertures 1104 formed therethrough. As with the WAIM surface 102 of FIG. 9, the WAIM surface 1100 may be coupled to the feed layer 104.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. An antenna element, comprising:

a balun configured to convert an unbalanced signal to a balanced signal and having an input, a first output, and a second output; and a feed layer having a first feed coupled to the first output of the balun, a second feed coupled to the second output of the balun, a first ridge coupled to the first feed, a second ridge coupled to the second feed, and a center post.

2. The antenna element of claim 1 wherein the balun, the feed layer, the center post, the first ridge, and the second ridge are formed integral with a printed circuit board (PCB).

3. The antenna element of claim 2 further comprising a radio frequency (RF) circuit coupled to or integrated with a second side of the PCB, wherein the feed layer is coupled to or integrated with a first side of the PCB and configured to at least one of transmit or receive wireless signals from the first side of the PCB.

4. The antenna element of claim 1 further comprising a wide area impedance matching (WAIM) layer at least one of in close proximity to or in contact with the feed layer.

5. The antenna element of claim 4 wherein the WAIM layer includes a shaped WAIM layer or a planar WAIM layer that defines apertures.

6. The antenna element of claim 1 wherein:

the first feed and the second feed include conductive traces;

the first ridge and the second ridge include vias; and the center post includes a conductor.

7. The antenna element of claim 1 wherein the first ridge is out of phase relative to the second ridge by 180 degrees.

8. The antenna element of claim 1 further comprising a second balun configured to convert a second balanced signal to a second unbalanced signal and having an input, a first output, and a second output, wherein:

the feed layer further includes a third feed coupled to the first output of the second balun, a fourth feed coupled to the second output of the second balun, a third ridge coupled to the third feed, and a fourth ridge coupled to the fourth feed; and the first feed and the second feed are configured to at least one of transmit or receive a single polarized electrical field, and the third feed and the fourth feed are configured to at least one of transmit or receive a second electrical field that is orthogonal to the single polarized electrical field.

9. The antenna element of claim 1 wherein the balun includes:

an input conductive trace having:

a first conductive arm coupled to the input, a center conductive arm, a second conductive arm, a first bend corresponding to a first quarter wavelength located between the first conductive arm and the center conductive arm, and a second bend corresponding to a second quarter wavelength located between the center conductive arm and the second conductive arm;

a first output trace coupled to the first output and to the first conductive arm; and a second output trace coupled to the second output and to the second conductive arm, the first output trace corresponding to a 180 degree phase shift relative to the second output trace.

10. The antenna element of claim 1 wherein the balun includes:

a slot having two circular portions connected by a neck;

an input feed coupled to the input and including an electrical trace extending over the neck of the slot; and an output feed having a first output trace coupled to the first output, a second output trace coupled to the second output, and a connector trace coupling the first output trace to the second output trace.

11. The antenna element of claim 1 wherein the balun includes a broadband coupling between the feed layer and a transmission line on which a signal is received.

12. The antenna element of claim 1 wherein the balun and the feed layer are implemented in a layered or monolithic structure that is manufactured using at least one of additive or subtractive means.

13. An antenna element, comprising:

a printed circuit board (PCB);

a balun formed integral with the PCB and configured to convert an unbalanced signal to a balanced signal and having an input, a first balanced side, and a second balanced side; and a feed layer formed integral with the PCB and having a first feed coupled to the first side of the balun, a second feed coupled to the second side of the balun, a first ridge coupled to the first feed, a second ridge coupled to the second feed, and a center post.

14. The antenna element of claim 13 further comprising a radio frequency (RF) circuit coupled to or integrated with a second side of the PCB, wherein the feed layer is coupled to or integrated with a first side of the PCB and configured to at least one of transmit or receive wireless signals from the first side of the PCB.

15. The antenna element of claim 13 further comprising a wide area impedance matching (WAIM) layer at least one of in close proximity to or in contact with the feed layer, the WAIM layer including at least one of a shaped WAIM layer or a planar WAIM layer that defines apertures.

16. The antenna element of claim 13 wherein:

the first feed and the second feed include conductive traces;

the first ridge and the second ridge include vias; and the center post includes a conductor.

17. The antenna element of claim 13 further comprising a second balun configured to convert a second unbalanced signal to a second balanced signal and having an input, a first balanced side, and a second balanced side, wherein:

the feed layer further includes a third feed coupled to the first balanced side of the second balun, a fourth feed coupled to the second balanced side of the second balun, a third ridge coupled to the third feed, and a fourth ridge coupled to the fourth feed; and the first feed and the second feed are configured to at least one of transmit or receive a single polarized electrical field, and the third feed and the fourth feed are configured to at least one of transmit or receive a second polarized electrical field that is orthogonal to the single polarized electrical field.

18. The antenna element of claim 13 wherein the balun includes:

an input conductive trace having:

a first conductive arm coupled to the input, a center conductive arm, a second conductive arm, a first bend corresponding to a first quarter wavelength located between the first conductive arm and the center conductive arm, and a second bend corresponding to a second quarter wavelength located between the center conductive arm and the second conductive arm;

a first output trace coupled to the first balanced side and to the first conductive arm; and a second output trace coupled to the second balanced side and to the second conductive arm, the first output trace corresponding to a 180 degree phase shift relative to the second output trace.

19. The antenna element of claim 13 wherein the balun includes:

a slot having two circular portions connected by a neck;

an input feed coupled to the input and including an electrical trace extending over the neck of the slot; and an output feed having a first output trace coupled to the first balanced side, a second output trace coupled to the second balanced side, and a connector trace coupling the first output trace to the second output trace.

20. An antenna element, comprising:

a printed circuit board (PCB);

a balun formed integral with the PCB and configured to convert an unbalanced signal to a balanced signal and having an input, a first output, and a second output;

a feed layer formed integral with the PCB and having a first feed coupled to the first output of the balun, a second feed coupled to the second output of the balun, a first ridge coupled to the first feed, a second ridge coupled to the second feed, and a center post; and a wide area impedance matching (WAIM) layer bonded to the PCB and at least one of in close proximity to or in contact with the feed layer.

* * * * *